US008663728B2

(12) United States Patent
Yuan et al.

(10) Patent No.: US 8,663,728 B2
(45) Date of Patent: Mar. 4, 2014

(54) PROTEIN STABILIZER SYSTEMS COMPRISING CARRAGEENAN FOR WEAKLY ACIDIC FLAVORED MILK DRINKS (75) Inventors: Chienkuo Ronnie Yuan, San Diego, CA (US); Michelle Nicole Steele, San Diego, CA (US); Neil Argo Morrison, San Diego, CA (US); Barbara Louise Chinn, San Diego, CA (US)

(73) Assignee: CP Kelco U.S., Inc., Atlanta, GA (US)

( * ) Notice: Subject to any disclaimer, the term of this patent is extended or adjusted under 35 U.S.C. 154(b) by 266 days.

(21) Appl. No.: 12/821,518

(22) Filed: Jun. 23, 2010

(65) Prior Publication Data
US 2011/0020507 A1    Jan. 27, 2011

Related U.S. Application Data (60) Provisional application No. 61/227,114, filed on Jul. 21, 2009.

(51) Int. Cl.
*A23L 2/00* (2006.01)
(52) U.S. Cl.
USPC .......................................... 426/590; 426/573
(58) Field of Classification Search
USPC ....................................................... 426/590
See application file for complete search history.

(56) References Cited

U.S. PATENT DOCUMENTS

| 4,910,035 | A | 3/1990 | Ellis |
| 5,290,582 | A | 3/1994 | Dressel et al. |
| 5,869,118 | A | 2/1999 | Morris et al. |
| 6,042,854 | A | 3/2000 | Morris et al. |
| 6,153,247 | A | 11/2000 | Stoddard |
| 6,171,633 | B1 | 1/2001 | Dulebohn et al. |
| 6,180,159 | B1 | 1/2001 | Villagran et al. |

(Continued)

FOREIGN PATENT DOCUMENTS

| AU | 2003248286 | 4/2004 |
| CN | 101057628 | 10/2007 |

(Continued)

OTHER PUBLICATIONS

FAO 411; Title: A guide to the seaweed industry . . . ; Produced by: Fisheries and Aquaculture Department ; publication 2003; ISBN: 9251049580; a FAO Fisheries Technical Paper.*

(Continued)

*Primary Examiner* — Patricia George
(74) *Attorney, Agent, or Firm* — Sutherland Asbill & Brennan LLP (57) ABSTRACT

Mildly acidic milk and soy beverages and methods for preparation of mildly acidic milk and soy beverages are provided herein. The acidified milk and soy beverages generally comprise a milk product and a stabilizer system at a mildly acidic pH in the range of about 5.0 to about 6.0. In particular embodiments, the beverage further comprises one or more components to provide a fruit flavor to the acidified milk beverage. In embodiments, the acidified milk and soy beverages comprise a milk product in an amount sufficient to provide milk protein and/or soy protein in the beverage in an amount from about 0.25% by weight to about 4.0% by weight of the beverage and a stabilizer system comprising a carrageenan component and optionally a high acyl gellan gum. The carrageenan component desirably comprises a mildly extracted kappa-iota copolymer with minimal alkaline modification.

19 Claims, 1 Drawing Sheet

Particle size distribution of 0.2% "KIC M" carrageenan stabilized milk drink, pH 5.30

(56) References Cited

U.S. PATENT DOCUMENTS

| | | | |
|---|---|---|---|
| 6,413,561 | B1 | 7/2002 | Sass et al. |
| 6,544,515 | B1 | 4/2003 | Dangin et al. |
| 6,921,548 | B2 | 7/2005 | McCampbell |
| 7,241,467 | B2 | 7/2007 | Ashourian et al. |
| 7,285,301 | B2 | 10/2007 | McCampbell |
| 2001/0041208 | A1* | 11/2001 | Orris et al. ............ 426/573 |
| 2004/0009274 | A1 | 1/2004 | McCampbell |
| 2004/0043043 | A1* | 3/2004 | Schlyter et al. ............ 424/400 |
| 2004/0071821 | A1 | 4/2004 | Ashourian et al. |
| 2004/0228954 | A1 | 11/2004 | Tejayadi |
| 2005/0003054 | A1 | 1/2005 | McCampbell |
| 2005/0233046 | A1* | 10/2005 | Krawczyk et al. ............ 426/573 |
| 2007/0026124 | A1 | 2/2007 | Yuan et al. |
| 2007/0026125 | A1 | 2/2007 | Yuan et al. |
| 2008/0095901 | A1 | 4/2008 | Boerboom et al. |
| 2008/0260908 | A1 | 10/2008 | Mutilangi et al. |
| 2008/0280007 | A1 | 11/2008 | Van Dijk et al. |
| 2008/0287300 | A1* | 11/2008 | Kopesky et al. ............ 504/294 |
| 2009/0186144 | A1* | 7/2009 | Chin ............ 426/593 |
| 2009/0252852 | A1 | 10/2009 | Mellema et al. |
| 2010/0068351 | A1 | 3/2010 | Roth |

FOREIGN PATENT DOCUMENTS

| | | | | |
|---|---|---|---|---|
| CN | 101099512 | * | 1/2008 | ............ A23C 9/154 |
| EP | 1224868 | A1 | 7/2002 | |
| JP | 51123864 | | 10/1976 | |
| JP | 403083543 | | 4/1991 | |
| JP | 403175932 | | 7/1991 | |
| JP | 2003169616 | | 6/2003 | |
| JP | 2004321007 | | 11/2004 | |
| JP | 2008005751 | | 1/2008 | |
| WO | 94/18853 | | 9/1994 | |
| WO | 2005096832 | | 10/2005 | |

OTHER PUBLICATIONS

Disclosure under 37 CFR 1.56 for U.S. Appl. No. 12/821,518, filed Apr. 20, 2012.
International Preliminary Report on Patentability for PCT/IB2010/001756 mailed Feb. 2, 2012.
International Search Report and Written Opinion, PCT/IB2010/001756, International Searching Authority, Apr. 11, 2011.
Michon C et al., "Structure evolution of carrageenan/milk gels: effect of shearing, carrageenan concentration and nu fraction on rheological behavior," Food Hydrocolloids, May 1, 2005, pp. 541-547, vol. 19, No. 3, Elsevier, Netherlands.
Dyrby M et al., "Towards on-line monitoring of the composition of commercial carrageenan powders," Carbohydrate Polymers, Sep. 13, 2004, pp. 337-348, vol. 57, No. 3, Applied Science Publishers, Ltd., Great Britain.
Anonymous, "High-profiled exhibition: Food ingredients (FI) Asia 2010," FI Asia, Sep. 14, 2010, XP002628387.

* cited by examiner

Particle size distribution of 0.2% "KIC M" carrageenan stabilized milk drink,, pH 5.30

PROTEIN STABILIZER SYSTEMS COMPRISING CARRAGEENAN FOR WEAKLY ACIDIC FLAVORED MILK DRINKS

CROSS-REFERENCE TO RELATED APPLICATIONS

The present application claims priority under 35 U.S.C. §119 to U.S. Provisional Patent Application Ser. No. 61/227,114 filed in the U.S. Patent and Trademark Office on Jul. 21, 2009, the disclosure of which is expressly incorporated herein by reference in its entirety.

BACKGROUND

Embodiments of the present invention relate to acidic milk and soy beverages having improved stability. In particular, embodiments of the present invention relate to weakly acidic flavored milk and soy beverages comprising a carrageenan stabilizer system.

The beverage industry has considerable interest in providing healthy, on-the-go beverages that have a desirable flavor, texture, and appearance. One example of such a beverage includes acidic fruit juice-containing milks; however, numerous challenges are associated with creating stable acidified milk-juice drinks. For example, there may be significant difficulties in providing stable protein complexes over the shelf-life of the product and ensuring proper suspension of the protein complexes and insoluble ingredients such as minerals, pulp, and fiber.

Protein protection at low pH is critical to prevent aggregation of the milk proteins during acidification and thermal processing of the beverage. The proteins found in neutral pH milk are relatively small in micellular size and possess a net negative charge that allows the particles to repel one another and remain in solution. As the pH of the milk approaches the isoelectric point of the protein, around pH 4.6, the net charge on the protein is reduced and the proteins have a tendency to self-associate, or aggregate. As the pH is further reduced below the isoelectric point, this effect worsens and additional heat treatment of the beverage exacerbates instability such that the denatured proteins strongly aggregate, causing dense sedimentation to occur over the shelf-life of the beverage. This can result in an appearance that consumers often find unappealing at best, and proteins that have an unpleasant mouthfeel and that are extremely difficult to re-disperse at worst.

Maintaining small protein particle sizes (i.e., micellular sizes) is necessary to maintain the stability of these beverages, as is demonstrated by Stokes' Law. Conventional stabilizers such as pectin, cellulose gum, soy bean fiber, and propylene glycol alginate are employed to minimize the association of these proteins during beverage processing. These anionic polymers act as protective hydrocolloids by associating with the protein below its isoelectric point, and inhibiting the extensive protein-protein interactions that would otherwise result from their reduced charge repulsion. Proper colloidal protection allows the protein micellular size to remain small (around 1.0 μm) and stable over the shelf life of the drink.

The afore-mentioned protective colloids are most effective within a pH range of 3.5 to 4.2. Although beverages produced at these pH typically have a pleasing flavor profile with considerable acid bite, it is desirable to provide stable acidified milk-juice beverages with higher pH such that milder fruit flavors can be formulated with a less-tart taste. These products have pH values of around 5.0 to 5.5, which are above the desirable operating range for the most commonly used protective hydrocolloids.

In general, milk-based beverages produced between a pH of 5.0 and 5.5 are above the isoelectric point of the protein, making electrostatic interactions between an anionic hydrocolloid and a weakly-negatively charged protein extremely difficult to achieve. As such, other, preferably natural, stabilizers are desirable in order to stabilize the protein in this weakly acidic pH range, while accommodating existing ultra high temperature (UHT) sterilization, high temperature/short time (HTST) pasteurization, and other processes used to heat-treat milk beverages.

SUMMARY

The present application addresses the above-described needs by providing an acidified milk beverage comprising a milk product and a stabilizer system, wherein the milk product is present in an amount sufficient to provide milk protein in an amount of at least about 0.25% by weight of the beverage. The stabilizer system comprises a carrageenan component, wherein the carrageenan component comprises Mu carrageenan in an amount from about 2% by weight to about 7% by weight of the carrageenan component and Nu carrageenan in an amount from about 10% by weight to about 17% by weight of the carrageenan component, and wherein the combined total of the Mu carrageenan and the Nu carrageenan is present in the carrageenan component in an amount from about 15% by weight to about 22% by weight of the carrageenan component. The beverage has a pH in the range of about 5.0 to about 6.0.

Also provided are methods for preparing an acidified milk beverage. In an embodiment, a method for preparing an acidified milk beverage comprises hydrating a carrageenan component to obtain a hydrated carrageenan component, blending the hydrated carrageenan component into a milk product to provide a mixture; acidifying the mixture with an acidulant to a pH in the range of about 5.0 to about 6.0, homogenizing the mixture, heat treating the mixture, and thereafter cooling the mixture to obtain an acidified milk beverage. The carrageenan component comprises Mu carrageenan in an amount from about 2% by weight to about 7% by weight of the carrageenan component and Nu carrageenan in an amount from about 10% by weight to about 17% by weight of the carrageenan component, and wherein the combined total of the Mu carrageenan and the Nu carrageenan is present in the carrageenan component in an amount from about 15% by weight to about 22% by weight of the carrageenan component.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DESCRIPTION

Embodiments of the present invention relate to acidified milk drinks having improved stability, stabilizer systems for improving the stability of the acidified milk drinks, and methods for preparing the same. In particular, embodiments of the present invention comprise acidified milk drinks having improved stability imparted by a stabilizer system comprising a carrageenan and optionally a gellan gum. Such stabilizer systems are particularly desirable for fruit-flavored or fruit juice-containing acidified milk drinks having a mildly acidic pH.

Acidified Milk Beverages

The acidified milk beverages provided herein generally comprise a milk product and a stabilizer system. In particular embodiments, the beverage further comprises one or more fruit ingredients, flavors, and/or acidulants to impart a fruit flavor to the acidified milk beverage.

"Acidified milk drink," is synonymous with "acidified milk beverage," and is used herein to describe a beverage comprising a milk product and a stabilizer system at an acidic or mildly acidic pH.

"Mildly acidic," is synonymous with "weakly acidic," and is used herein to describe a beverage having a pH from about 5.0 to about 6.0. In particular embodiments, the acidified milk drink has a pH from about 5.1 to about 5.7, from about 5.2 to about 5.6, or from about 5.2 to about 5.5. Those skilled in the art will appreciate that the pH of the beverage may be modified using any suitable food grade acidulent, non-limiting examples of which include citric acid, malic acid, lactic acid, phosphoric acid, and/or ascorbic acid.

"Milk drink," as used herein, describes a beverage comprising milk product and a stabilizer system at an acidic or mildly acidic pH.

The Milk Product

"Milk product," as used herein, includes milk and soy based products. The milk product may comprise any suitable dairy milk product, non-limiting examples of which include a non-fat milk (e.g., skim milk), 2% fat content milk, whole milk, reconstituted dried or powdered milk, milk protein concentrates and/or isolates, and other forms of milk such as evaporated milk, condensed milk, and the like. The milk product may also comprise soy milk products (i.e., soy protein products), which may include soy milk protein concentrates and/or isolates, whole soy milk, and the like.

"Milk protein," as used herein, includes protein derived from milk and/or soy products. The milk product desirably is present in the beverages in an amount sufficient to provide milk protein in an amount of at least about 0.25% by weight of the beverage. In particular embodiments, the milk product is present in the beverages in an amount sufficient to provide milk protein in an amount from about 0.5% by weight to about 4.0% by weight of the beverage, from about 0.25% by weight to about 3.0% by weight of the beverage, from about 0.5% by weight to about 2.5% by weight of the beverage, from about 1.0% by weight to about 2.0% by weight of the beverage, or any amount therebetween.

In particular embodiments it may be desirable to provide a concentrated form of the acidified milk drink that may be diluted by a consumer or other end-user prior to consumption. Those skilled in the art should appreciate that in such embodiments the amount of milk product present in the concentrated product will be greater than the amount of milk product present in the resulting diluted end-product. Thus, it is intended that the embodiments of the present invention also encompass the concentrated form of mildly acidified milk drinks.

The Stabilizer System

The stabilizer system desirably comprises a carrageenan component and optionally a gellan gum. Not wishing to be bound by any theory, it is believed that the carrageenan component and gellan gum each provide their own functionality to the stabilizer system—the carrageenan component providing colloidal stability to the milk proteins during thermal treatments and the gellan gum forming a network structure capable of providing long term suspension of the milk proteins and other insoluble particulates.

Gellan Gum

Gellan gum is a polysaccharide produced by the microorganism *Sphingomonas eladea*. The molecular structure of gellan gum is a linear tetrasaccharide composed of 3- and 4-linked β-D-Glc regularly repeated between β-D-GlcA and α-L-Rha in a four-unit repeat structure.

In the high acyl (native) form, two acyl substituents—acetate and glycerate—are present on the same glucose residue with, on average, one glycerate per repeat and one acetate per every two repeats. High acyl gellan gum forms gels with a soft, elastic, non-brittle texture upon cooling. In dilute solutions, gellan gum can produce a "fluid gel". At high temperatures, gellan gum exists as a random coil. As a gellan gum solution cools, these coils form an entangled network of helical structures. The molecular entanglement in the fluid gel can trap and hold particulate material in its network. Measurement of the elastic modulus (G') can be used to quantify the strength of this internal network.

The gellan gum of the stabilizer systems provided herein may comprise any gellan gum suitable for use in mildly acidic milk drinks. In one embodiment, the gellan gum comprises a high acyl gellan gum, a non-limiting example of which is commercially available and includes KELCOGEL® Hi-pHive gellan gum (CP Kelco U.S., Inc.). Those of ordinary skill in the art should appreciate that gellan gums may be used in either their purified or standardized form (and that the amount of gellan gum in the beverage may be adjusted accordingly).

It surprisingly has been discovered that the amount of gellan gum required in embodiments of the present invention is inversely dependent upon the amount of milk protein present in the beverage. As the amount of milk protein is increased, the amount of gellan gum required to stabilize the beverage will decrease. Thus, embodiments comprising higher levels of milk protein may not require a gellan gum in the stabilizer system. Not wishing to be bound by any theory, those of ordinary skill in the art also will appreciate that it is desirable to optimize the amount of gellan gum used in the beverage in order to minimize cost while still maintaining a sufficient network for suspension of particles. For example, in embodiments in which the long-term suspension of particles in the beverage is less important to the manufacturer and/or consumer, the gellan gum may be omitted from the stabilizer system (e.g., where shaking of the beverage would provide sufficient suspension of the particles immediately prior to consumption of the beverage).

In one embodiment, the gellan gum of the stabilizer system is present in the beverage in an amount from about 0.005% by weight to about 0.035% by weight of the beverage. According to other embodiments, the gellan gum of the stabilizer system is present in the beverage in an amount from about 0.015% by weight to about 0.03% by weight of the beverage, from about 0.02% by weight to about 0.03% by weight of the beverage, or any amount therebetween.

Carrageenan

Carrageenans are high molecular weight linear polysaccharides of alternating 1,3-linked β-D-galactopyranosyl and 1,4-linked α-D-galactopyranosyl units. The 1,3-linked units occur as the 2- and 4-sulfates, or are occasionally unsulfated. The 1,4-linked units occur as the 2- and 6-sulfates (the 2,6-disulfate, the 3,6-anhydride, and the 3,6-anhydride-2-sulfate). There are many possibilities for substitution on the basic copolymer, leading to several different types of carrageenans.

Three main types of carrageenan have been identified—kappa, iota, and lambda carrageenan—which are idealized linear polymers assigned definitive repeating structures. The differences between the three basic carrageenans are the amount of 3,6-anhydrogalactose units, the number of sulphate ester groups, and their positions. Kappa and iota carrageenans are obtained by 6-de-sulphation of their respective precursors known as Mu and Nu carrageenans, resulting in the formation of 3,6-anhydride linkages. The 3,6-anhydrogalactose unit is partly produced enzymatically in a seaweed and also by alkaline modification during carrageenan processing.

Commercially available carrageenan products are extracted from various seaweed types. Carrageenan extracted from *Kappaphycus alvarezii* is mainly kappa-type carrageenan, whereas carrageenans obtained from *Euchema spinosum* and *Euchema denticulatum* plants are mainly iota-type. Kappa-iota copolymeric carrageenan can be produced from *Gigartina radula* and *Chondrus crispus* seaweeds. These seaweed types are also called "bi-component" as they provide different carrageenan types, either kappa-iota copolymers or lambda carrageenan, depending on the life stage of the seaweed. It therefore is possible to produce carrageenan products with varying amounts of different carrageenan types by seaweed selection and changing process conditions.

The carrageenan component for the stabilizer system provided herein desirably comprises a kappa-iota copolymer comprising a mixture of both Mu and Nu carrageenan precursors. The quantity of the various types of carrageenans is determined using the Fourier transform infrared (FTIR) spectroscopic methods described in the publication entitled "Towards on-line monitoring of the composition of commercial carrageenan powders," *Carbohydrate Polymers* 57 (2004) 337-348, the disclosure of which is incorporated herein by reference in its entirety. The percentages of the various types of carrageenans are based on analysis of pure, non-standardized carrageenan.

In one embodiment, the kappa carrageenan is present in the carrageenan component in an amount from about 15% by weight to about 37% by weight of the carrageenan component, the iota carrageenan is present in the carrageenan component in an amount from about 24% by weight to about 42% by weight of the carrageenan component, and the combined total of the kappa carrageenan and iota carrageenan is present in the carrageenan component in an amount from about 40% by weight to about 79% by weight of the carrageenan component. In one embodiment, the Mu carrageenan is present in the carrageenan component in an amount from about 2% by weight to about 7% by weight of the carrageenan component, the Nu carrageenan is present in an amount from about 10% by weight to about 17% by weight of the carrageenan component, and the combined total of the Mu carrageenan and the Nu carrageenan is present in the carrageenan component in an amount from about 1.5% by weight to about 22% by weight of the carrageenan component.

In one embodiment, the kappa carrageenan is present in the carrageenan component in an amount from about 17% by weight to about 34% by weight of the carrageenan component, from about 18% by weight to about 30% by weight, or from about 19% by weight to about 26% by weight. In one embodiment, the iota carrageenan is present in the carrageenan component in an amount from about 24% by weight to about 38% by weight of the carrageenan component, from about 25% by weight to about 37% by weight, or from about 26% by weight to about 36% by weight. In one embodiment, the combined total of the kappa carrageenan and iota carrageenan is present in the carrageenan component an amount from about 42% by weight to about 71% by weight of the carrageenan component, from about 44% by weight to about 66% by weight, or from about 46% by weight to about 63% by weight.

In one embodiment, the Mu carrageenan is present in the carrageenan component in an amount from about 2% by weight to about 6% by weight of the carrageenan component, from about 3% by weight to about 6% by weight, or from about 4% by weight to about 6% by weight. In one embodiment, the Nu carrageenan is present in the carrageenan component in an amount from about 10% by weight to about 16% by weight of the carrageenan component, from about 11% by weight to about 16% by weight, or from about 11% by weight to about 15% by weight. In one embodiment, the combined total of the Mu carrageenan and Nu carrageenan is present in the carrageenan component in an amount from about 15% by weight to about 20% by weight of the carrageenan component, from about 16% by weight to about 20% by weight, or from about 17% by weight to about 19% by weight.

Carrageenans which are suitable for use in the stabilizer systems of the acidified milk beverages provided herein may be prepared using a mildly alkaline extraction from a carrageenan-bearing seaweed. Such methods are known to those skilled in the art. Suitable carrageenans also may be commercially available, a non-limiting example of which includes GENU® Hi-pHive carrageenan (CP Delco U.S., Inc.).

In one embodiment, the carrageenan component of the stabilizer system is present in the beverage in an amount from about 0.05% by weight to about 0.60% by weight of the beverage. According to other embodiments, the carrageenan component of the stabilizer system is present in the beverage in an amount from about 0.10% by weight to about 0.50% by weight of the beverage, from about 0.15% by weight to about 0.45% by weight of the beverage, from about 0.20% by weight to about 0.35% by weight of the beverage, or any amount therebetween. The amount of carrageenan required in embodiments of the present invention is dependent upon the amount of milk protein present. As the amount of milk protein and/or soy milk protein is increased, the amount of carrageenan required to stabilize the beverage will increase.

Optional Ingredients

In some embodiments it is particularly desirable to provide an acidified milk beverage having a fruit flavor. The fruit flavor may be provided by including one or more fruit ingredients in the acidified milk product, non-limiting examples of which include fresh fruits, frozen fruits, fruit purees, frozen fruit purees, fruit juices, frozen fruit juices, fruit puree concentrates, frozen fruit puree concentrates, fruit juice concentrates, and/or frozen fruit juice concentrates. Such fruit ingredients are well known to those of ordinary skill in the art.

Other ingredients which also may be added to the acidified milk beverages embodied herein include other flavorings (e.g., chocolate, vanilla, strawberry, etc.); natural or artificial sweeteners, sugars, or corn syrups; vegetable purees or vegetable juices; natural or artificial preservatives; soluble or insoluble fiber; and/or nutritional additives such as vitamins, minerals, and herbal supplements.

Beverage Viscosity, Elastic Modulus, and Particle Size

The acidified milk beverages provided herein have both excellent protein protection and suspension of particulates such as fruit pieces and tri-calcium phosphate, while also maintaining a light and refreshing mouthfeel that is enjoyable for the consumer. These desirable characteristics may be further described in terms of the beverage viscosity, elastic modulus, and particle size. Those of ordinary skill in the art will appreciate that these parameters will vary with the protein content and process.

In one embodiment, an acidified milk beverage having a milk protein level in the range of about 1.0% by weight to about 4.0% by weight is characterized by a viscosity in the range of about 10 cP to about 50 cP at 75 sec$^{-1}$ when measured using a Bohlin rheometer. According to other embodiments, an acidified milk beverage having a milk protein level in the range of about 1.0% by weight to about 2.5% by weight is characterized by a viscosity in the range from about 10 cP to about 30 cP at 75 sec$^{-1}$, from about 11 cP to about 29 cP at 75 sec$^{-1}$, from about 11 cP to about 28 cP, or any amount therebetween.

In one embodiment an acidified milk beverage is characterized by an elastic modulus of less than about 3.0 dynes/cm$^2$. According to other embodiments, the acidified milk beverage is characterized by an elastic modulus from about 0.4 dynes/cm$^2$ to less than about 3.0 dynes/cm$^2$, from about 0.4 dynes/cm$^2$ to about 2.5 dynes/cm$^2$, from about 0.4 dynes/cm$^2$ to about 2.0 dynes/cm$^2$, or any amount therebetween.

In one embodiment an acidified milk beverage is characterized by a particle size of less than about 10 μm. According to other embodiments, the acidified milk beverage is characterized by a particle size of less than about 8 μm, of less than about 6 μm, or of less than about 5 μm, or any amount therebetween.

Methods of Preparing Acidified Milk Beverages

Also provided herein are methods for preparing acidified milk beverages. The process generally comprises hydrating the carrageenan component of the stabilizer system to obtain a hydrated carrageenan component, blending the hydrated carrageenan component with the milk product and the gellan gum to provide a mixture; acidifying the mixture with an acidulant to a desired pH; exposing the mixture to a heat treatment to activate the gellan gum; homogenizing the heated mixture; sterilizing or pasteurizing the heated mixture; and thereafter cooling the mixture to obtain the sterile or pasteurized acidified milk beverage. The method optionally may further comprise blending a fruit ingredient and one or more other ingredients with the mixture prior to heating and homogenization of the mixture. The method also optionally may further comprise the aseptic filling of the acidified milk beverage into one or more sterile containers.

Methods for the heat treatment of beverages are well known to those of ordinary skill in the art. Non-limiting examples of suitable heat treatment methods include ultra high temperature (UHT) sterilization, high temperature/short time (HTST) pasteurization, vat pasteurization, and the like.

Methods for the homogenization of the mixture also are well known to those of ordinary skill in the art. In particular embodiments, the mixture alternatively may be subjected to high or low speed shearing and/or sonication in lieu of homogenization.

Embodiments of the present description are further illustrated by the following examples, which are not to be construed in any way as imparting limitations upon the scope thereof. On the contrary, it is to be clearly understood that resort may be had to various other embodiments, modifications, and equivalents thereof which, after reading the description therein, may suggest themselves to those skilled in the art without departing from the spirit of the present invention and/or the scope of the appended claims. Unless otherwise specified, quantities referred to by percentages (%) are by weight (wt %).

EXAMPLES

In the Examples below, several methods were used to evaluate the beverage stability. These include the elastic modulus (G'), viscosity, and particle size. The following describes the techniques used to make these evaluations.

Elastic Modulus (G')

Dynamic rheological measurements were performed with a Vilastic V-E Viscoelasticity Analyzer (Vilastic Scientific, Inc., Austin, Tex.) equipped with a circulating water bath temperature controller at 20° C. Tests were carried out with a precision capillary tube (0.0537 cm inner radius with a tube length of 6.137 cm). Elastic modulus was measured at a frequency of 1 Hz (6.28 rad/s) and a strain of 0.3 (30%). The integration time for measurement was 5 seconds and each sample was analyzed using the average of ten elastic modulus (G') data points. Typically a G' value of 0.4 to 2.0 dynes/cm$^2$ indicates that adequate suspension is provided by the gellan gum network (at 0.02 to 0.03% by weight use levels). A very high G' value (>3 dynes/cm$^2$) in an acidified milk drink system with up to 2.5% by weight milk protein stabilized with 0.02 to 0.03% by weight gellan gum is usually an indication of protein flocculation or gelation. However, high G' values (>3 dynes/cm$^2$) may result in suitable acidified milk drink systems with 3.5% to 4.0% by weight milk protein when the sufficient protection is provided by the carrageenan alone, even in the absence of gellan gum.

Viscosity

The viscosity was measured using a Bohlin rheometer with a cone (4°, 4-cm diameter) and plate geometry. The measurement was made at 20° C. using a constant shear protocol at 75 sec$^{-1}$ for 60 seconds.

Particle Size

Particle size was measured by using a laser light diffraction particle size analyzer, a Malvern Mastersizer 2000 (Malvern Instruments, UK). The average particle size was based on particle diameter. The midpoint of the cumulative size distribution, d(0.5), was determined to be the value at which 50% of the particles have a size lower than the value.

Example 1

Weakly Acidic Milk-Juice Beverages Having 1.5% Milk Protein

Various quantities of carrageenan and high acyl gellan gum were evaluated in order to determine the suitable use levels for long-term shelf life of an ultra high-temperature (UHT) treated 1.5% protein milk-juice drink at pH 5.30. The beverage was prepared as follows:
1. a 2% carrageenan solution was prepared by dispersing carrageenan into ambient temperature water, mixing for 20 minutes or until no lumps remained, to allow it to hydrate;
2. the carrageenan solution was added to water and milk;
3. a dry blend of sugar and a high acyl gellan gum was prepared and combined with the carrageenan/water/milk solution;
4. an orange juice concentrate was added;
5. the beverage was acidified to a pH of 5.3 with a citric acid solution;
6. the beverage was subjected to a UI-IT process, preheating the beverage to 87.8° C., homogenizing the beverage using a 2-stage homogenization process (2000 psi first stage, 500 psi second stage), and sterilizing the beverage at 141.1° C. for 4 seconds; and
7. the beverage was filled into sterile containers at ambient temperature.

The criterion used to evaluate shelf-life was a smooth, non-gritty texture with uniform appearance (i.e., no sedimentation of protein, no serum layer formation or phase separation of the product) that lasted for at least 6 months at room temperature. These properties were quantified by the elastic modulus and particle size, as described herein. A minimum elastic modulus of at least 0.6 dynes/cm² was considered to be sufficient to satisfy shelf life while a particle size of no more than 10 μm at d(0.5) was considered to provide acceptable texture.

The carrageenan used was GENU® Hi-pHive carrageenan (CP Kelco U.S., Inc.). The high acyl gellan gum used was KELCOGEL® Hi-pHive gellan gum (CP Kelco U.S., Inc.). The milk protein was from fresh fluid 2% butterfat milk or reconstituted non-fat dry milk. The formulations, elastic modulus, viscosity, average particle size, and visual observation after 2 weeks are summarized in Tables 1 and 2.

only the carrageenan had a smooth, non-gritty texture with small particle sizes; however, sedimentation was still observed. Using high acyl gellan gum in addition to the carrageenan mitigated the sedimentation. The elastic modulus (G') measurements were consistent with these observations, with higher G' values in beverages containing gellan gum. Not wishing to be bound by any theory, it is believed that the higher G' values and decreased sedimentation were the result of a gellan gum network structure capable of suspending the protein.

The beverage having 0.25% carrageenan with 0.0225% high acyl gellan gum had a G' of 0.95 dynes/cm² and particle size of 0.8 μm, and was fully stable for at least 6 months shelf life at room temperature. Not wishing to be bound by any

TABLE 1

Weakly Acidic Milk-Juice Beverages (1.5% Milk Protein)

|  | 0.20% carrageenan only | 0.25% carrageenan only | 0.30% carrageenan only |
|---|---|---|---|
| Water | 32.00 wt % | 29.50 wt % | 27.00 wt % |
| Milk, 2% Fat | 50.00 wt % | 50.00 wt % | 50.00 wt % |
| Sugar | 4.00 wt % | 4.00 wt % | 4.00 wt % |
| Orange Juice concentrate (pulp free) | 4.00 wt % | 4.00 wt % | 4.00 wt % |
| Carrageenan (2% solution) | 10.00 wt % | 12.50 wt % | 15.00 wt % |
| High Acyl Gellan Gum | 0.0000 wt % | 0.0000 wt % | 0.0000 wt % |
| Anhydrous citric acid (50% w/w solution) | to pH 5.3 | to pH 5.3 | to pH 5.3 |
| Total | 100.00 wt % | 100.00 wt % | 100.00 wt % |
| G' (dynes/cm²) | 0 | 0 | 0 |
| Viscosity @ 75 s⁻¹ (cP) | 6.1 | 6.6 | 7.9 |
| Average particle size (μm) | 0.9 | 0.9 | 0.9 |
| Visual observations | sedimentation | sedimentation | sedimentation |

TABLE 2

Weakly Acidic Milk-Juice Beverages (1.5% Milk Protein)

|  | 0.25% carrageenan + 0.015% high acyl gellan gum | 0.25% carrageenan + 0.0225% high acyl gellan gum | 0.25% carrageenan + 0.025% high acyl gellan gum | 0.25% carrageenan + 0.03% high acyl gellan gum |
|---|---|---|---|---|
| Water | 29.485 wt % | 29.4775 wt % | 29.475 wt % | 29.47 wt % |
| Milk, 2% Fat | 50.00 wt % | 50.00 wt % | 50.00 wt % | 50.00 wt % |
| Sugar | 4.00 wt % | 4.00 wt% | 4.00 wt % | 4.00 wt % |
| Orange Juice concentrate (pulp free) | 4.00 wt % | 4.00 wt % | 4.00 wt % | 4.00 wt % |
| Carrageenan (2% solution) | 12.50 wt % | 12.50 wt % | 12.50 wt % | 12.50 wt % |
| High Acyl Gellan Gum | 0.0150 wt % | 0.0225 wt % | 0.0250 wt % | 0.0300 wt % |
| Anhydrous citric acid (50% w/w solution) | to pH 5.3 | to pH 5.3 | to pH 5.3 | to pH 5.3 |
| Total | 100.00 wt % | 100.00 wt % | 100.00 wt % | 100.00 wt % |
| G' (dynes/cm²) | 0.23 | 0.95 | 1.71 | 5.49 |
| Viscosity @ 75 s⁻¹ (cP) | 11.6 | 16.4 | 18.9 | 32.5 |
| Average particle size (μm) | 0.7 | 0.8 | 0.9 | 2.9 |
| Visual observations | smooth, uniform/ slight dusting | smooth, uniform | smooth, uniform/ highly structured | smooth, uniform/ slight gel |

Beverages were prepared and stored for 4 days at room temperature prior to evaluation. Beverages prepared using theory, it is believed that each component in this combined system contributes its own function to beverage stability— the carrageenan working to achieve colloidal stability of the milk proteins during heat treatment at pH 5.3 and the high acyl gellan gum creating a network structure capable of providing long term suspension of the milk proteins.

Example 2

Weakly Acidic Milk-Juice Beverages Having 1.0% Milk Protein

Various quantities of carrageenan and high acyl gellan gum were evaluated in order to determine the necessary use levels for long-term shelf life of an ultra high-temperature (UHT) treated 1.0% protein milk-juice drink at pH 5.30. The beverage was prepared using the same components and evaluated using the same methods and criteria as Example 1. The formulations, elastic modulus, viscosity, and average particle size are summarized in Table 3.

0.20% carrageenan and 0.03% high acyl gellan gum had the best overall stability of the formulations tested, with a G' of 0.97 dynes/cm$^2$ and particle size of 6.7 μm, and having a shelf life of at least 6 months at room temperature.

Example 3

Weakly Acidic Milk-Juice Beverages Having 2.0% Milk Protein

Various quantities of carrageenan and high acyl gellan gum were evaluated in order to determine the necessary use levels for long-term shelf life of an ultra high-temperature (UHT) treated 2.0% protein milk-juice drink at pH 5.30. The beverage was prepared using the same components and evaluated using the same methods and criteria as Example 1. The for-

TABLE 3

Weakly Acidic Milk-Juice Beverages (1.0% Milk Protein)

|  | 0.15% carrageenan + 0.02% high acyl gellan gum | 0.20% carrageenan + 0.02% high acyl gellan gum | 0.25% carrageenan + 0.02% high acyl gellan gum | 0.20% carrageenan + 0.025% high acyl gellan gum | 0.20% carrageenan + 0.03% high acyl gellan gum |
|---|---|---|---|---|---|
| Water | 65.68 wt % | 63.18 wt % | 60.68 wt % | 63.175 wt % | 63.17 wt % |
| Non-fat dry milk powder, med heat (17% solution) | 19.66 wt % | 19.66 wt % | 19.66 wt % | 19.66 wt % | 19.66 wt % |
| Sugar | 4.00 wt % | 4.00 wt % | 4.00 wt % | 4.00 wt % | 4.00 wt % |
| Orange Juice concentrate (pulp free) | 3.14 wt % | 3.14 wt % | 3.14 wt % | 3.14 wt % | 3.14 wt % |
| Carrageenan (2% solution) | 7.5 wt % | 10 wt % | 12.5 wt % | 10 wt % | 10 wt % |
| High Acyl Gellan Gum | 0.02 wt % | 0.02 wt % | 0.02 wt % | 0.025 wt % | 0.03 wt % |
| Anhydrous citric acid (50% w/w solution) | to pH 5.3 | to pH 5.3 | to pH 5.3 | to pH 5.3 | to pH 5.3 |
| Total | 100.00 wt % | 100.00 wt % | 100.00 wt % | 100.00 wt % | 100.00 wt % |
| G' (dynes/cm$^2$) | 0.28 | 0.42 | 0.42 | 0.6 | 0.97 |
| Viscosity @ 75 s$^{-1}$ (cP) | 9.5 | 10.7 | 11.4 | 11.8 | 14.6 |
| Average particle size (μm) | 6.6 | 3.4 | 4.7 | 3.3 | 6.7 |

Beverages were prepared and stored for 4 days at room temperature prior to evaluation. Beverages prepared using mulations, elastic modulus, viscosity, and average particle size are summarized in Table 4.

TABLE 4

Weakly Acidic Milk-Juice Beverages (2.0% Milk Protein)

|  | 0.25% carrageenan + 0.02% high acyl gellan gum | 0.30% carrageenan + 0.02% high acyl gellan gum | 0.35% carrageenan + 0.02% high acyl gellan gum |
|---|---|---|---|
| Water | 41.01 wt % | 38.51 wt % | 36.01 wt % |
| Non-fat dry milk powder, med heat (17% solution) | 39.33 wt % | 39.33 wt % | 39.33 wt % |
| Sugar | 4.00 wt % | 4.00 wt % | 4.00 wt % |
| Orange Juice concentrate (pulp free) | 3.14 wt % | 3.14 wt % | 3.14 wt % |
| Carrageenan (2% solution) | 12.5 wt % | 15 wt % | 17.5 wt % |

TABLE 4-continued

| Weakly Acidic Milk-Juice Beverages (2.0% Milk Protein) | | | |
|---|---|---|---|
| | 0.25% carrageenan + 0.02% high acyl gellan gum | 0.30% carrageenan + 0.02% high acyl gellan gum | 0.35% carrageenan + 0.02% high acyl gellan gum |
| High Acyl Gellan Gum | 0.02 wt % | 0.02 wt % | 0.02 wt % |
| Anhydrous citric acid (50% w/w solution) | to pH 5.3 | to pH 5.3 | to pH 5.3 |
| Total | 100.00 wt % | 100.00 wt % | 100.00 wt % |
| G' (dynes/cm$^2$) | 0.61 | 0.81 | 1.06 |
| Viscosity @ 75 s$^{-1}$ (cP) | 10.6 | 15.0 | 18.8 |
| Average particle size (μm) | 4.4 | 3.4 | 5.1 |

Beverages were prepared and stored for 4 days at room temperature prior to evaluation. Beverages prepared using 0.35% carrageenan and 0.02% high acyl gellan gum had the best overall stability of the formulations tested, with a G' of 1.06 dynes/cm$^2$, a viscosity of 18.8 cP at 75 s$^{-1}$, and particle size of 5.1 μm, and had a shelf life of at least 6 months at room temperature.

Example 4

Weakly Acidic Milk-Juice Beverages Having 2.5% Milk Protein

Various quantities of carrageenan and high acyl gellan gum were evaluated in order to determine the necessary use levels for long-term shelf life of an ultra high-temperature (UHT) treated 2.5% protein milk-juice drink at pH 5.30. The beverage was prepared using the same components and evaluated using the same methods and criteria as Example 1. The formulations, elastic modulus, viscosity, and average particle size are summarized in Table 5.

Small increases in the amount of gellan gum were observed to cause large increases in the measured value of G'. In addition, the viscosity for these beverages was much higher due to the high protein concentration. Beverages prepared using 0.45% carrageenan and 0.0125% high acyl gellan gum had the best overall stability for the systems tested, with a G' of 0.84 dynes/cm and particle size of 7.5 μm, and having a shelf life of at least 6 months at room temperature.

Example 5 pH Stability of Weakly Acidified Milk-Juice Beverages

The effect of pH on the stability of a weakly acidified milk drink was evaluated. The beverage was prepared with 1.5% milk protein and a stabilizer system comprising 0.25% carrageenan and 0.0225% high acyl gellan gum. The beverage was prepared using the same components and evaluated using the same methods and criteria as Example 1. The formulations, elastic modulus, viscosity, and average particle size, and visual observations after 2 weeks are summarized in Tables 6 and 7.

TABLE 5

| Weakly Acidic Milk-Juice Beverages (2.5% Milk Protein) | | | |
|---|---|---|---|
| | 0.45% carrageenan + 0.00625% high acyl gellan gum | 0.45% carrageenan + 0.0125% high acyl gellan gum | 0.45% carrageenan + 0.0175% high acyl gellan gum |
| Water | 21.18875 wt % | 21.1825 wt % | 21.1775 wt % |
| Non-fat dry milk powder, med heat (17% solution) | 49.165 wt % | 49.165 wt % | 49.165 wt % |
| Sugar | 4.00 wt % | 4.00 wt % | 4.00 wt % |
| Orange Juice concentrate (pulp free) | 3.14 wt % | 3.14 wt % | 3.14 wt % |
| Carrageenan (2% solution) | 22.50 wt % | 22.50 wt % | 22.50 wt % |
| High Acyl Gellan Gum | 0.00625 wt % | 0.0125 wt % | 0.0175 wt % |
| Anhydrous citric acid (50% w/w solution) | to pH 5.3 | to pH 5.3 | to pH 5.3 |
| Total | 100.00 wt % | 100.00 wt % | 100.00 wt % |
| G' (dynes/cm$^2$) | 0.21 | 0.84 | 2.17 |
| Viscosity @ 75 s$^{-1}$ (cP) | 16.3 | 28.4 | 34.4 |
| Average particle size (μm) | 7.2 | 7.5 | 10.9 |

TABLE 6

Weakly Acidified Milk-Juice Beverage Formulation

| | 0.25% carrageenan + 0.0225% high acyl gellan gum |
|---|---|
| Water | 30.3375 wt % |
| 2% Milk | 50.00 wt % |
| Sugar | 4.00 wt % |
| Orange Juice concentrate (pulp free) | 3.14 wt % |
| Carrageenan (2% solution) | 12.50 wt % |
| High Acyl Gellan Gum | 0.0225 wt % |
| Anhydrous citric acid (50% w/w solution) | to desired pH |
| Total | 100.00 wt % |

TABLE 7 pH Stability of Weakly Acidified Milk-Juice Beverages (1.5% Milk Protein)

| pH | 4.8 | 5.0 | 5.1 | 5.2 | 5.3 | 5.4 | 5.5 | 5.6 | 5.8 |
|---|---|---|---|---|---|---|---|---|---|
| G' (dynes/cm$^2$) | 0.46 | 0.32 | 0.78 | 0.87 | 0.74 | 0.69 | 0.64 | 0.78 | 0.67 |
| Viscosity @ 75 s$^{-1}$ (cP) | 9.54 | 9.76 | 15.44 | 14.22 | 14.26 | 14.37 | 14.88 | 17.07 | 16.53 |
| Average particle size (μm) | 8.9 | 7.6 | 3.5 | 3.3 | 1.3 | 1.1 | 1.1 | 1.8 | 4 |
| Visual observations* | Floc'd, phase sep. | phase sep. | serum layer | smooth, uniform | smooth, uniform | smooth, uniform | smooth, uniform | serum layer | phase sep. |

*Abbreviations for Visual Observations (Floc'd = flocculated; Phase sep. = phase separation)

Beverages having a pH between 5.2 and 5.5 produced the smoothest and most stable weakly acidic milk drinks, having elastic modulus values between 0.64 and 0.87 dynes/cm$^2$, and average particle sizes between 1.1 and 3.3 μm. For 1.5% protein-containing beverages having a pH of 5.1 or 5.6, the elastic modulus and average particle sizes were within acceptable ranges; however, a serum layer started to develop during the shelf-life of the product. More extensive phase separation was observed for beverages having pH values less than 5.1 or greater than 5.6, suggesting that preferred pH ranges for this particular beverage are from 5.2 to 5.5. However, a second study was conducted with 1% protein-containing beverages having a pH of 5.8, 5.9 and 6.0, and it was found that all of these beverages remained smooth and uniform, with elastic modulus and average particle sizes that were within acceptable ranges (Table 8). This indicated that the carrageenan type is capable of stabilizing weakly acidic milk drinks in the pH range of about 5.0 to 6.0, although higher protein levels may affect visual uniformity.

TABLE 8 pH Stability of Weakly Acidified Milk-Juice Beverages (1.0% Milk Protein)

| | 5.8 | 5.9 | 6.0 |
|---|---|---|---|
| G' (dynes/cm$^2$) | 0.7 | 0.67 | 0.58 |
| Viscosity @ 75 s$^{-1}$ (cP) | 15.22 | 14.59 | 13.72 |
| Average particle size (μm) | 5.4 | 5.9 | 3 |
| Visual Observations | smooth, uniform | smooth, uniform | smooth, uniform |

Example 6

Effect of Carrageenan Composition on Stability of Weakly Acidified Milk-Juice Beverages

The effect of the carrageenan composition was evaluated by using four different carrageenan types in mildly acidic milk protein drinks within a pH range of 5.0 to 5.5. The four carrageenan types were:

1. kappa-iota copolymer extracted from bi-component-type, cold water red seaweed under a mildly alkaline pH close to neutral condition ("KIC M"),
2. kappa-iota copolymer extracted from a bi-component-type, cold water red seaweed under a higher pH, more alkaline condition ("KIC H"),
3. lambda carrageenan, and
4. iota carrageenan.

The KIC M type carrageenan was GENU® Hi-pHive carrageenan (CP Kelco U.S., Inc.), the iota carrageenan was GENUVISCO® J-DS (CP Kelco U.S., Inc.), while the KIC H and lambda carrageenan were extracted in the laboratory using methods known to those of skill in the art.

A total of four "KIC M" samples, two "KIC H" samples, one lambda sample and one iota sample were studied. The four KIC M samples also contained various amounts of lambda carrageenan, since the seaweed used for the extraction included both the kappa-iota hybrid and the lambda-bearing seaweed. The chemical compositions of the 6 kappa-iota copolymers were determined using an FTIR method as described by Dyrby et al. (*Carbohydrate Polymers* (2004), 57(3), 337-348), the results of which are summarized in Table 9. Due to overlapping spectral signals, it is typical that the sum of all carrageenan types as measured by the FTIR method does not add up to 100%.

TABLE 9

Chemical Composition of Kappa-Iota Copolymers

| | | Kappa-iota copolymer | | | |
|---|---|---|---|---|---|
| Sample | Lambda | Kappa | Iota | Mu | Nu |
| KIC M #1 | 22% | 20% | 34% | 3% | 14% |
| KIC M #2 | 14% | 25% | 34% | 6% | 14% |
| KIC M #3 | 3% | 33% | 38% | 6% | 11% |
| KIC M #4 | 31% | 19% | 27% | 5% | 13% |
| KIC H #1 | 0% | 45% | 54% | 5% | 5% |
| KIC H #2 | 0% | 41% | 55% | 5% | 5% |

Beverages then were prepared using the following general formulation:

TABLE 10

Weakly Acidified Milk-Juice Beverage Formulations

| Ingredients | Percent |
| --- | --- |
| Water | To 100.00 wt % |
| 2% fat milk | 50.00 wt % |
| Sugar | 4.00 wt % |
| Orange Juice Concentrate (Pulp Free) | 3.14 wt % |
| Carrageenan | varies |
| Gellan gum | varies |
| Anhydrous citric acid (50% w/w solution) | To desired pH |
| Total | 100.00 wt % |

The gellan gum was a native, high acyl type gellan gum KELCOGEL® Hi-pHive carrageenan (CP Kelco U.S., Inc.). The beverage formulation was prepared using the following method, which is substantially similar to the method of the foregoing examples:

1. a 2% carrageenan solution* was prepared by dispersing carrageenan into 70° C. water, mixing for 20 minutes or until no lumps remained, to allow it to hydrate, and cooled to ambient temperature;

(*For lambda and iota carrageenan pre-solutions (Examples 6D & 6E), 0.5% carrageenan pre-solutions were prepared, and the formula water adjusted accordingly)

2. the carrageenan solution was added to water and milk;
3. a dry blend of sugar and a high acyl gellan gum was prepared and combined with the carrageenan/water/milk solution;
4. an orange juice concentrate was added;
5. the beverage was acidified to the desired pH with a citric acid solution;
6. the beverage was subjected to a UHT process, preheating the beverage to 82° C., homogenizing the beverage using a 2-stage homogenization process (2000 psi first stage, 500 psi second stage), and sterilizing the beverage at 141° C. for 4 seconds; and
7. the beverage was filled into sterile containers at ambient temperature.

Beverages were evaluated using the same methods and criteria as Example 1, described above. The beverages also were evaluated visually for any sedimentation or protein flocculation defects during storage. The visual observations after 2 weeks of storage are reported in the examples below.

Example 6A

Three acidified milk drinks (pH 5.3) were made with (1) no stabilizer, (2) 0.2% KIC M #1 carrageenan, and (3) 0.2% KIC M #1 carrageenan plus 0.02% high acyl gellan gum. Elastic modulus (G'), particle size, and visual observations of the samples are reported in Table 11, below. No samples or data were collected for the sample without added stabilizer due to significant fouling of the UHT machine by protein precipitation during UHT processing.

TABLE 11

Acidified Milk Drinks With and Without Added Stabilizer

|  | No Stabilizer | 0.2% carrageenan | 0.2% carrageenan + 0.02% high acyl gellan gum |
| --- | --- | --- | --- |
| G' (dynes/cm$^2$) | NA | 0 | 0.95 |
| Particle size d(0.5) (μm) | NA | 0.97 | 0.83 |
| Visual observations | NA | dusting/sedimentation | smooth, uniform |

Figure 1:
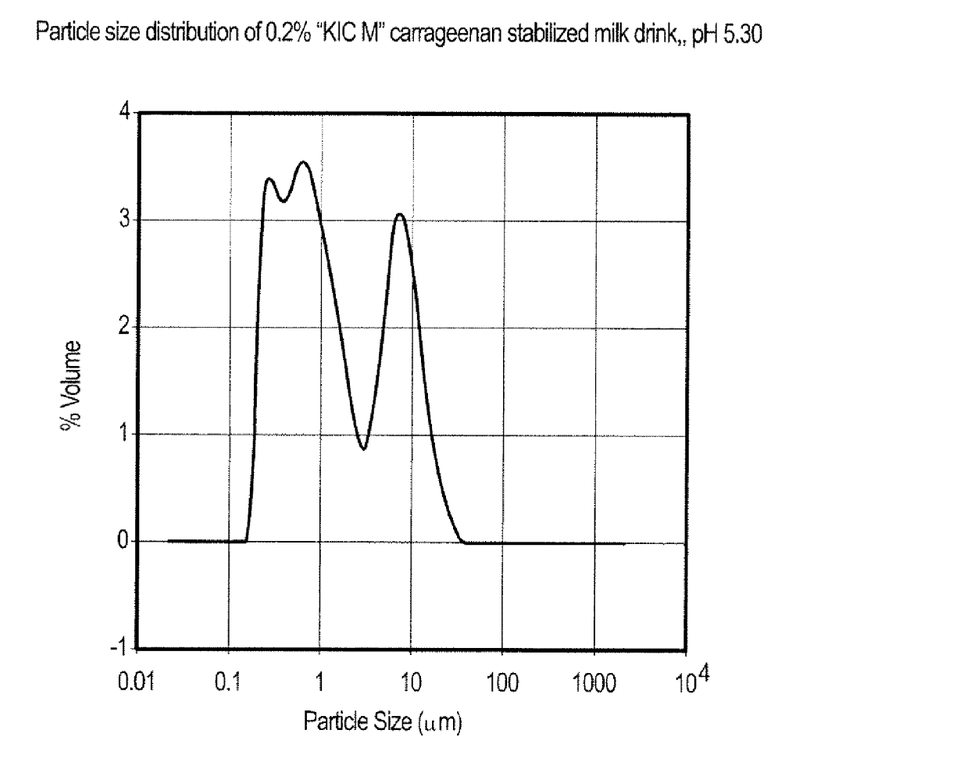
FIG. 1 is a graph of the particle size distribution for a weakly acidic milk drink stabilized with a Kappa-Iota Copolymer Carrageenan and having a pH of 5.3.

The particle size distribution for the pH 5.3 milk drink stabilized with carrageenan alone demonstrated a bimodal distribution of protein particle sizes, despite having a d(0.5) particle size of ~10 μm (FIG. 1). Although the carrageenan can function as a protective colloid for the protein under these weakly acidic conditions, the second peak (near 10 μm) in the particle size distribution suggests that populations of larger particles may settle during long term storage.

Beverages that contained gellan gum in addition to the carrageenan were capable of forming a weak gel network that prolonged stability of these large particles. The added stability was confirmed by the elastic modulus values, in which the carrageenan-only sample lacked a measurable elastic modulus compared with an elastic modulus of 0.95 dynes/cm$^2$ for the beverage that contained 0.02% high acyl gellan gum. After several weeks, sedimentation of protein was observed in the carrageenan only beverage, while the beverages containing gellan gum did not develop sedimentation and remained stable for at least 6 months at room temperature.

Example 6B

Three "KIC M" carrageenan samples (#2, #3, and #4, as shown above) were used at 0.2% in conjunction with 0.025% high acyl gellan gum in acidified milk drinks at a pH 5.2 and 5.5 to demonstrate the functionality of this stabilizer system under different pH conditions. The elastic modulus and particle size of these beverages are summarized in the Table 12.

TABLE 12

Functionality of Stabilizer System under Different pH Conditions

|  | KIC M #2 | | KIC M #3 | | KIC M #4 | |
| --- | --- | --- | --- | --- | --- | --- |
|  | pH 5.2 | pH 5.5 | pH 5.2 | pH 5.5 | pH 5.2 | pH 5.5 |
| G' (dynes/cm$^2$) | 0.52 | 1.23 | 0.63 | 0.86 | 0.43 | 0.69 |
| Particle size d(0.5) (μm) | 3.4 | 5.7 | 5.8 | 1.1 | 2.6 | 1.1 |

All milk drinks demonstrated good G' values (between 0.43 to 1.23 dynes/cm$^2$) and exhibited good long term stability without sedimentation or phase separation.

Example 6C

Two "KIC H" carrageenan samples (#1 and #2, shown above) were used at 0.15, 0.2, and 0.25% in conjunction with 0.025% high acyl gellan gum in acidified milk drinks at a pH 5.3 to evaluate the effect of the extraction conditions of the carrageenan (e.g., under harsh or mild alkaline conditions) on protein protection functionality. The elastic modulus, particle size, and visual observations after 2 weeks for these beverages are summarized in Table 13.

TABLE 13

Effect of Extraction Conditions on Protein Protection Functionality

|  | KIC H #1 | | | KIC H #2 | | |
| --- | --- | --- | --- | --- | --- | --- |
|  | 0.15% | 0.2% | 0.25% | 0.15% | 0.2% | 0.25% |
| G' (dynes/cm$^2$) | 11.78 | 5.10 | 8.18 | 15.57 | 14.10 | 7.54 |
| Particle size d(0.5) (μm) | 35 | 36.9 | 48.5 | 29.5 | 45.1 | 60.4 |
| Visual observations | Floc'd | Floc'd | Floc'd | Floc'd | Floc'd | Floc'd |

The high values of both the G' and particle size suggest that the KIC H carrageenan samples failed to properly protect the protein during thermal processing, resulting in a flocculated appearance.

Example 6D

An iota carrageenan sample was used at 0.07, 0.14, 0.21, and 0.29% in conjunction with 0.025% high acyl gellan gum in acidified milk drinks at a pH 5.3 to evaluate the protein protection functionality of iota type carrageenans in mildly acidified milk drinks. The elastic modulus, particle size, and visual observations after 2 weeks for these beverages are summarized in Table 14.

TABLE 14

Protein Protection Functionality in Mildly Acidified Milk Drinks

|  | iota carrageenan | | | |
| --- | --- | --- | --- | --- |
|  | 0.07% | 0.14% | 0.21% | 0.29% |
| G' (dynes/cm$^2$) | 0.34 | 0.58 | 1.0 | 1.2 |
| Particle size d(0.5) (μm) | 74.4 | 77.6 | 18.0 | 12.6 |
| Visual observations | Visible protein aggregates, grainy | Visible protein aggregates, grainy | Floc'd, separated, grainy | Floc'd, separated, grainy |

As the foregoing illustrates, these beverages were not stable and had large particle sizes.

Example 6E

A lambda carrageenan sample was used at 0.025, 0.05, 0.10, 0.15, and 0.20% in conjunction with 0.025% high acyl gellan gum in acidified milk drinks at a pH 5.3 to evaluate the protein protection functionality of lambda type carrageenans in mildly acidified milk drinks. All samples resulted in fouling in UHT during processing due to severe protein precipitation, suggesting that lambda type carrageenan was not suitable as a protective hydrocolloid for the mildly acidic milk drink.

Example 6F

The functionality of a carrageenan including both lambda carrageenan and "KIC H" carrageenan (which does not contain lambda carrageenan) was evaluated using three amounts of lambda carrageenan (3.5%, 17.6%, and 38.2%). The total carrageenan in the beverages was 0.17% along with 0.025% high acyl gellan gum. The elastic modulus and particle size of these beverages are summarized in Table 15.

TABLE 15

Functionality of Lambda Carrageenan

|  | % of lambda in lambda-KIC H mixture (0.17% total use level) | | |
| --- | --- | --- | --- |
|  | 3.5% | 17.6% | 38.2% |
| G' (dynes/cm$^2$) | 7.16 | 7.81 | 4.5 |
| Particle size d(0.5) (μm) | 22.3 | 19.5 | 16.4 |

As the foregoing illustrates, the high G' and particle size indicate there was significant protein aggregation, suggesting that the mixture of "KIC H" and lambda carrageenan did not provide the same amount of protein protection as observed with "KIC M" carrageenan in mildly acidic milk drinks.

Example 7

Weakly Acidic Milk-Juice Beverages Having 1% Soy Protein

The use of soy protein in a weakly acidified milk drink was tested in a 1.0% soy protein system, based on soy protein isolate and soy milk, and increasing concentrations of carrageenan with 0.03% high acyl gellan gum. The beverage was prepared using the same components and evaluated using the same methods and criteria as Example 1. The formulation used, elastic modulus, viscosity, and particle sizes are summarized in Tables 16 and 17.

TABLE 16

Weakly Acidic Milk-Juice Beverages (Soy Protein Isolate)

|  | 0.15% carrageenan + 0.03% high acyl gellan gum | 0.20% carrageenan + 0.03% high acyl gellan gum | 0.25% carrageenan + 0.03% high acyl gellan gum |
| --- | --- | --- | --- |
| Water | 76.90 wt % | 74.40 wt % | 71.90 wt % |
| Soy protein isolate (15% solution) | 8.40 wt % | 8.40 wt % | 8.40 wt % |
| Sugar | 4.00 wt % | 4.00 wt % | 4.00 wt % |
| Orange Juice concentrate (pulp free) | 3.14 wt % | 3.14 wt % | 3.14 wt % |
| Carrageenan (2% solution) | 7.5 wt % | 10 wt % | 12.5 wt % |
| High Acyl Gellan Gum | 0.03 wt % | 0.03 wt % | 0.03 wt % |
| Anhydrous citric acid (50% solution) | to pH 5.30 | to pH 5.30 | to pH 5.30 |

TABLE 16-continued

Weakly Acidic Milk-Juice Beverages (Soy Protein Isolate)

|  | 0.15% carrageenan + 0.03% high acyl gellan gum | 0.20% carrageenan + 0.03% high acyl gellan gum | 0.25% carrageenan + 0.03% high acyl gellan gum |
|---|---|---|---|
| Total | 100 wt % | 100 wt % | 100 wt % |
| G' (dynes/cm$^2$) | 1.34 | 1.54 | 1.4 |
| Viscosity @ 75 s$^{-1}$ (cP) | 13.23 | 14.58 | 14.98 |
| particle size d(0.5) (μm) | 8.3 | 9.8 | 9.8 |

TABLE 17

Weakly Acidic Milk-Juice Beverages (1.0% Soy Milk Protein)

|  | 0.15% carrageenan + 0.03% high acyl gellan gum | 0.20% carrageenan + 0.03% high acyl gellan gum | 0.25% carrageenan + 0.03% high acyl gellan gum |
|---|---|---|---|
| Water | 58.7 wt % | 56.2 wt % | 53.7 wt % |
| Edensoy soymilk (3.75% protein) | 26.60 wt % | 26.60 wt % | 26.60 wt % |
| Sugar | 4.00 wt % | 4.00 wt % | 4.00 wt % |
| Orange Juice concentrate (pulp free) | 3.14 wt % | 3.14 wt % | 3.14 wt % |
| Carrageenan (2% solution) | 7.5 wt % | 10 wt % | 12.5 wt % |
| High Acyl Gellan Gum | 0.03 wt % | 0.03 wt % | 0.03 wt % |
| Anhydrous citric acid (50% solution) | to pH 5.30 | to pH 5.30 | to pH 5.30 |
| Total | 100 wt % | 100 wt % | 100 wt % |
| G' (dynes/cm$^2$) | 1.7 | 1.79 | 1.26 |
| Viscosity @ 75 s$^{-1}$ (cP) | 16.58 | 15.92 | 16.35 |
| particle size d(0.5) (μm) | 6.5 | 7.4 | 6 |

All samples possessed a smooth, uniform appearance and had acceptable G' values (between 1.26 and 1.79 dynes/cm$^2$) and average particle sizes (between 6 and 9.8 microns), suggesting that soy protein also may be used as a protein source in mildly acidic milk drinks.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereof.

What is claimed is:

1. An acidified milk beverage comprising a milk product and a stabilizer system, wherein:
   the milk product is present in an amount sufficient to provide milk protein in an amount of at least about 0.25% by weight of the acidified milk beverage;
   the stabilizer system comprises a carrageenan component;
   wherein the carrageenan component comprises Mu carrageenan in an amount from about 2% by weight to about 7% by weight of the carrageenan component, and Nu carrageenan in an amount from about 10% by weight to about 17% by weight of the carrageenan component, and wherein a combined total of the Mu carrageenan and the Nu carrageenan is present in the carrageenan component in an amount from about 15% by weight to about 22% by weight of the carrageenan component; and
   the acidified milk beverage has a pH in the range of about 5.0 to about 6.0;
   wherein the carrageenan component is present in the acidified milk beverage in an amount from about 0.05% by weight to about 0.6% by weight of the acidified milk beverage and provides colloidal stability and protein protection to the milk protein to prevent aggregation during a thermal treatment, and wherein the acidified milk beverage has an average protein particle size of less than about 10 μm.

2. The acidified milk beverage of claim 1, wherein the milk product comprises a dairy milk product or a soy milk product.

3. The acidified milk beverage of claim 1, wherein the milk product is present in an amount sufficient to provide milk protein in an amount from about 0.5% by weight to about 4.0% by weight of the acidified milk beverage.

4. The acidified milk beverage of claim 1, wherein the milk product is present in an amount sufficient to provide milk protein in an amount from about 0.5% by weight to about 2.5% by weight of the acidified milk beverage.

5. The acidified milk beverage of claim 1, wherein the stabilizer system further comprises a gellan gum.

6. The acidified milk beverage of claim 5, wherein the gellan gum comprises a high acyl gellan gum.

7. The acidified milk beverage of claim 5, wherein the high acyl gellan gum is present in the acidified milk beverage in an amount from about 0.005% by weight to about 0.035% by weight of the acidified milk beverage.

8. The acidified milk beverage of claim 1, wherein the carrageenan component is present in the acidified milk beverage in an amount from about 0.1% by weight to about 0.6% by weight of the acidified milk beverage.

9. The acidified milk beverage of claim 1, wherein the acidified milk beverage has an elastic modulus from about 0.4 dynes/cm$^2$ to less than about 3.0 dynes/cm$^2$.

10. The acidified milk beverage of claim 1, wherein the acidified milk beverage has a viscosity in the range of about 10 cP to about 50 cP at 75 sec$^{-1}$ when measured using a Bohlin rheometer.

11. The acidified milk beverage of claim 1, wherein the carrageenan component further comprises a kappa-iota copolymer,
   wherein a kappa carrageenan is present in the carrageenan component in an amount from about 15% by weight to about 37% by weight,
   an iota carrageenan is present in the carrageenan component in an amount from about 24% by weight to about 42% by weight, and
   a combined total of the kappa carrageenan and the iota carrageenan is an amount from about 40% by weight to about 79% by weight of the carrageenan component.

12. A beverage comprising:
   a milk product;
   the milk product present in an amount sufficient to provide a protein in an amount of at least about 0.25% by weight of the beverage;
   a stabilizer system comprising a kappa-iota carrageenan copolymer, wherein the kappa-iota carrageenan copolymer comprises:
      Mu carrageenan in an amount from about 2% by weight to about 7% by weight of the kappa-iota carrageenan copolymer; and
      Nu carrageenan in an amount from about 10% by weight to about 17% by weight of the kappa-iota carrageenan copolymer;
      wherein a combined total of the Mu carrageenan and the Nu carrageenan in the kappa-iota carrageenan copolymer is in an amount from about 15% by weight to about 22% by weight of the kappa-iota carrageenan copolymer; and
   the beverage has a pH in the range of about 5.0 to about 6.0;
   wherein the kappa-iota carrageenan copolymer is present in the beverage in an amount from about 0.05% by weight to about 0.6% by weight of the beverage and provides colloidal stability and protein protection to the protein to prevent aggregation during a thermal treatment, the beverage having an average protein particle size of less than about 10 μm.

13. A method of making a acidified milk beverage comprising a milk product and a stabilizer system, comprising:
   providing the milk product in an amount sufficient to provide milk protein in an amount of at least about 0.25% by weight of the acidified milk beverage; and
   stabilizing the acidified milk beverage with the stabilizer system, wherein the stabilizer system comprises:
      a carrageenan component comprising:
         Mu carrageenan in an amount from about 2% by weight to about 7 by weight of the carrageenan component; and
         Nu carrageenan in an amount from about 10% by weight to about 17% by weight of the carrageenan component;
         wherein a combined total of the Mu carrageenan and the Nu carrageenan is present in the carrageenan component in an amount from about 15% by weight to about 22% by weight of the carrageenan component;
   wherein the acidified milk beverage has a pH in the range of about 5.0 to about 6.0; and
   the carrageenan component is present in the acidified milk beverage in an amount from about 0.05% by weight to about 0.6% by weight of the acidified milk beverage and provides colloidal stability and protein protection to the milk protein to prevent aggregation during a thermal treatment, the acidified milk beverage having an average protein particle size of less than about 10 μm.

14. The method of claim 13, wherein the milk product comprises a dairy milk product or a soy milk product.

15. The method of claim 13, wherein the milk product is present in an amount sufficient to provide milk protein in an amount from about 0.5% by weight to about 4.0% by weight of the acidified milk beverage.

16. The method of claim 13, wherein the stabilizer system further comprises a gellan gum.

17. The method of claim 16, wherein the gellan gum comprises a high acyl gellan gum.

18. The method of claim 17 wherein the high acyl gellan gum is present in the beverage in an amount from about 0.005% by weight to about 0.035% by weight of the acidified milk beverage.

19. The method of claim 13, wherein the carrageenan component is present in the acidified milk beverage in an amount from about 0.1% by weight to about 0.6% by weight of the acidified milk beverage.

* * * * *